Sept. 24, 1929.  S. P. MILLAR  1,729,274
VEHICLE BUMPER
Filed Oct. 20, 1928
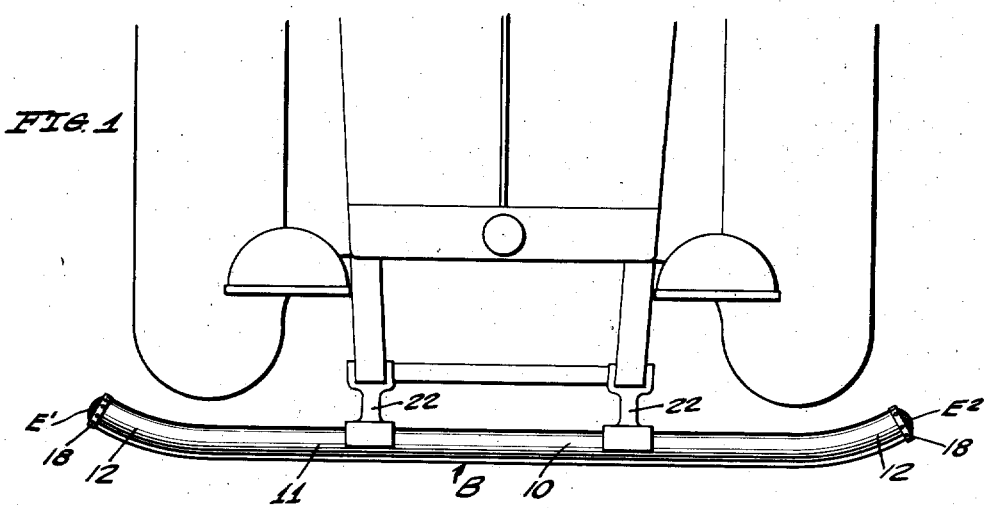
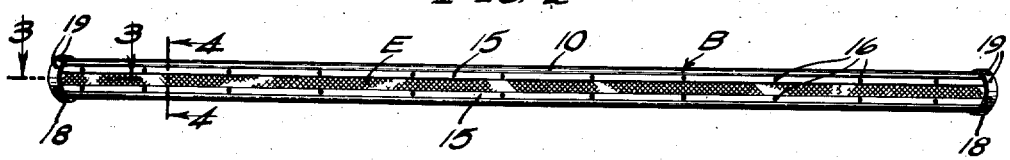
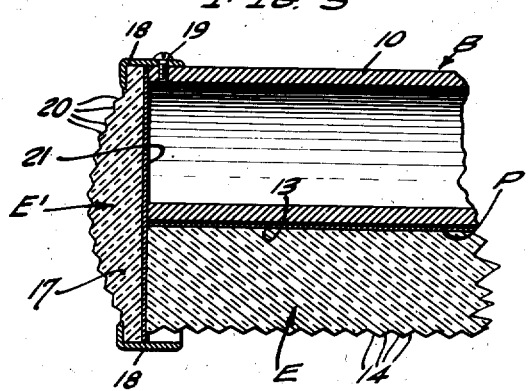
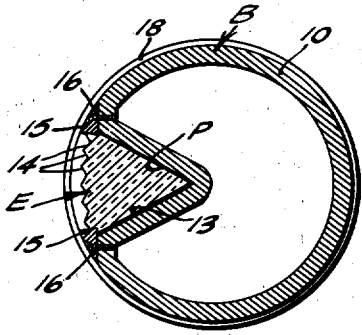
INVENTOR
S. P. MILLAR
BY Munn & Co.
ATTORNEYS Patented Sept. 24, 1929

1,729,274

UNITED STATES PATENT OFFICE

STEPHEN P. MILLAR, OF EL CENTRO, CALIFORNIA

VEHICLE BUMPER

Application filed October 20, 1928. Serial No. 313,803.

My invention relates to and has for a purpose the provision of a vehicle bumper by which light rays from the headlights of an approaching vehicle will produce such illumination on the bumper as to render the bumper clearly visible at night and thus enable approaching vehicles to safely clear each other in passing, notwithstanding glare from their headlights, which in many instances temporarily blinds or confuses drivers to such extent as to cause serious accidents. Furthermore the bumper embodying my invention serves to indicate to the drivers of traveling vehicles, the presence and extremity of a parked vehicle, so as to enable clearance to be given the parked vehicle by the drivers of passing vehicles.

I will describe only one form of vehicle bumper embodying my invention and will then point out the novel features thereof in claims.

In the accompanying drawing,

Fig. 1 is a view showing in plan a portion of a motor vehicle with one form of bumper embodying my invention applied thereto;

Fig. 2 is an enlarged view in front elevation of the bumper as it would appear to the driver of a vehicle approaching the vehicle to which the bumper is attached;

Fig. 3 is an enlarged sectional view of one end portion of the bumper taken on the line 3—3 of Fig. 2 and looking in the direction of the arrows; and Fig. 4 is an enlarged sectional view taken on the line 4—4 of Fig. 2 and looking in the direction of the arrows.

Referring specifically to the drawing in which similar reference characters designate similar parts in each of the several views, the bumper embodying by invention and designated generally at B is preferably constructed of a length of metal tubing 10 of suitable gage and diameter, with the opposite end portions of the tubing curved laterally to one and the same side of the intermediate linear portion 11 of the bumper as indicated at 12. The bumper is provided along its length with a pocket designated generally at P in which is adapted to be received and secured a light reflecting element designated at E, while other light reflecting elements E' and E² are adapted to be secured on the ends of the bumper.

In the present instance the pocket P is V-shaped in cross section and may be formed by proper shaping operations on the length of tubing 10 during the manufacture thereof, and in such manner that the resulting pocket will extend longitudinally of the bumper so as to be co-extensive in length therewith and to open to the outer side or the side of the bumper presented to vehicles approaching that vehicle to which the bumper is attached.

The light reflecting element E is in the form of a body of light reflecting material such as glass, and is of a length co-extensive with the length of the tubing 10 and of substantially triangular cross section so as to seat within the pocket P, the diverging or inner surfaces of the body being coated with a film of silver 13 or other mirror producing substance, while the outer surface of the body is exposed at the opening of the pocket P and is preferably suitably serrated to produce a multiplicity of light reflecting facets 14. The body may be of suitably colored glass if desired and is secured against displacement from the pocket P by means of a pair of members 15 in the form of metal strips co-extensive in length with the tubing 10 and secured by fastening members 16 at opposite sides of the pocket P in overlying relation to the edges of the exposed surface of the element E, the members 15 projecting inwardly beyond the exposed surface of the element E as is shown in Fig. 4 so as to effectively shield the element against direct contact with an obstacle when struck by the bumper.

The light reflecting elements E' and E² are of identical construction and in the present instance each is in the form of a plano-convex disk 17 of glass or other suitable material, and is of the same outside diameter as that of the tubing 10. The disks 17 are mounted in frames 18 in the form of inwardly flanged rings, and the frames are secured to the ends of the tubing 10 by fastening members 19, the convex sides of the disks being presented on the bumper ends and being preferably serrated to provide a multiplicity of light reflecting facets 20, while the inner flat surfaces of the disks are coated with films of silver or other mirror producing substance 21. The frames 18 overlie the ends of the members 15 so as to aid in securing the latter against displacement from the bumper and also to produce a neat finish at the joints of the parts.

The bumper as above described is adapted to be attached in any suitable manner by brackets 22 to a vehicle so as to extend across the full width of the vehicle at the front or rear of the latter as is customary, and it will be understood that the term bumper is intended to include the relatively short bumperettes, which in some instances are substituted for a full length bumper at the rear of a vehicle.

In the use of bumpers embodying my invention, it will be clear that light rays emanating from the headlights of approaching vehicles will be reflected by the elements E, E', and E², and will produce a luminous area along the length and on the ends of the bumper, which is clearly visible at night to the drivers of approaching vehicles, due to the fact that the headlights of the vehicles are disposed sufficiently above the bumpers to enable the drivers to shield their eyes from glare of the other vehicle's headlights by looking downward at the bumper of the other vehicle. The elements E, E', and E² will thus clearly indicate to the drivers of approaching vehicles the extreme width of the other vehicle so that the vehicles can be steered to safely clear each other in passing.

Although I have herein shown and described only one form of vehicle bumper embodying my invention, it is to be understood that various changes and modifications may be made therein without departing from the spirit of the invention and the spirit and scope of the appended claims.

I claim:

1. A vehicle bumper having a pocket therein extending longitudinally thereof at one side of the bumper, a light reflecting element in the pocket exposed at the open side of the pocket for reflecting light waves from a light source so as to illuminate the bumper in the dark, and means for securing said element against displacement from the pocket.

2. A vehicle bumper having a pocket therein extending longitudinally thereof at one side of the bumper, a light reflecting element in the pocket exposed at the open side of the pocket for reflecting light waves from a light source so as to illuminate the bumper in the dark, means for securing said element against displacement from the pocket, other light reflecting elements on the ends of the bumper, and means for securing said other light reflecting elements to the ends of the bumper.

3. A vehicle bumper having one side thereof provided with a pocket co-extensive in length with the bumper, a light reflecting element in the pocket and co-extensive in length with the pocket, and members secured to the bumper at opposite sides of the pocket for retaining said element against displacement from the pocket.

4. A vehicle bumper having one side thereof provided with a pocket co-extensive in length with the bumper, a light reflecting element in the pocket and co-extensive in length with the pocket, members secured to the bumper at opposite sides of the pocket for retaining said element against displacement from the pocket, other light reflecting elements on the ends of the bumper, and frames in which said other light reflecting elements are mounted for securing the latter on the bumper ends.

5. A vehicle bumper having an elongated pocket therein opening at one side of the bumper, a light reflecting element in the pocket, and means for securing said element against displacement from the pocket.

6. A vehicle bumper having an elongated pocket therein opening at one side of the bumper, a light reflecting element in the pocket, means for securing said element against displacement from the pocket, other light reflecting elements on the ends of the bumper, and means for securing said other light reflecting elements on the ends of the bumper.

7. A vehicle bumper having a longitudinally extending pocket therein co-extensive in length therewith and opening at the outer side of the bumper, a body of light reflecting material in the pocket and exposed at the opening of the latter for reflecting light rays from a source in a manner to cause illumination of the bumper in the dark, and members on opposite sides of the pocket secured to the bumper for retaining the body of light reflecting material against displacement from the pocket.

8. A vehicle bumper having a longitudinally extending pocket therein co-extensive in length therewith and opening at the outer side of the bumper, a body of light reflecting material in the pocket and exposed at the opening of the latter for reflecting light rays from a source in a manner to cause illumination of the bumper in the dark, and members on opposite sides of the pocket secured to the bumper for retaining the body of light reflecting material against displacement from the pocket, said members projecting beyond the body of light reflecting material so as to shield the latter against direct contact with an obstacle.

9. A vehicle bumper having a longitudinally extending pocket therein co-extensive in length therewith and opening at the outer side of the bumper, a body of light reflecting material in the pocket and exposed at the opening of the latter for reflecting light rays from a source in a manner to cause illumination of the bumper in the dark, members on opposite sides of the pocket secured to the bumper for retaining the body of light reflecting material against displacement from the pocket, other bodies of light reflecting material on the ends of the bumper, and frames in which said other bodies are mounted, for securing the latter on the ends of the bumper.

10. A vehicle bumper having a pocket therein of V-shaped cross section, extending longitudinally of and co-extensive in length with the bumper, the pocket opening at the outer side of the bumper, a body of light reflecting material of substantially triangular cross section, seated in the pocket and having one side exposed at the opening of the pocket, and members on opposite sides of the pocket overlying the edges of the body of light reflecting material and secured to the bumper for retaining the body of light reflecting material against displacement from the pocket.

11. A vehicle bumper as embodied in claim 10 wherein the bumper is substantially cylindrical in cross section, with disks of light reflecting material covering the ends of the bumper, and frames in which the disks are mounted, secured to the ends of the bumper and overlying the ends of said member.

Signed at El Centro, in the county of Imperial and State of California, this 6th day of October, A. D. 1928.

STEPHEN P. MILLAR.